June 10, 1958 J. A. FLIPPIN 2,838,281
AUTOMOBILE CARRIER WINCH
Filed April 5, 1957
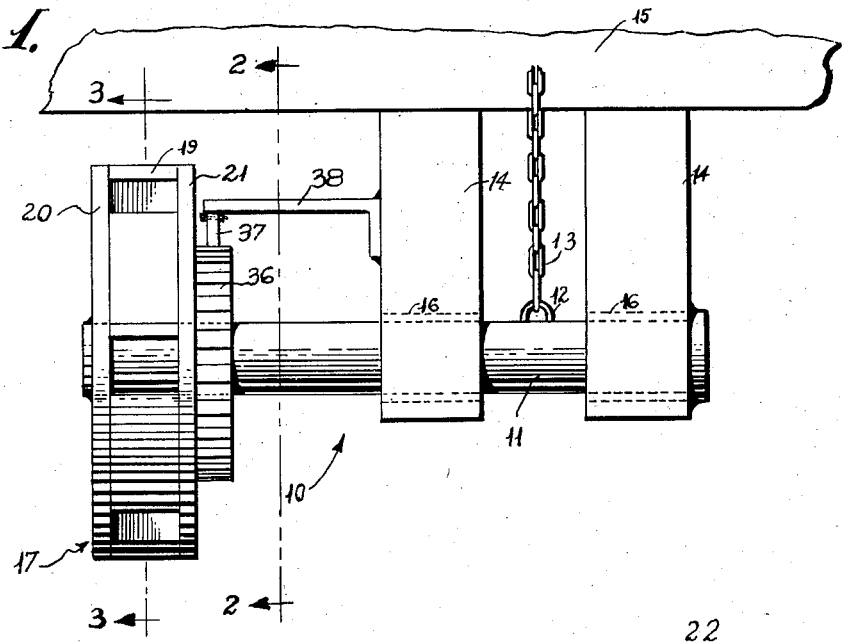
INVENTOR
Junior A. Flippin
BY Mason, Fenwick & Lawrence
ATTORNEYS

United States Patent Office 2,838,281
Patented June 10, 1958

2,838,281

AUTOMOBILE CARRIER WINCH

Junior A. Flippin, Janesville, Wis.

Application April 5, 1957, Serial No. 650,930

3 Claims. (Cl. 254—164)

The present invention relates in general to winch units, and more particularly to winch units and winch bars for use in the chaining operation for retaining automobiles on automobile carrier trailers.

Substantially all automobile transport trailers now in use are provided with winch units for securely chaining the vehicles to the trailer. The automobile, in order to be properly transported, must be securely chained down on all its four corners. The standard winch units in prevalent use throughout the industry for accomplishing this chaining process comprise a chain winch drum which is supported for rotation on the trailer about which the chain is wound for tightening the chain and securely fastening the automobile. They are designed to be manipulated by winch bars of circular cross-section which are merely slipped into round holes in the winch drum extending along radial axes and opening through the drum periphery. Use of this standard winch has been hazardous because the bar frequently would spring loose in the hands of the operator during manipulation of the winch. Since there is a great deal of pressure on the winch and bar at the time the bar springs loose, the released bar flying loose under heavy pressure has frequently caused severe injury.

An object of the present invention is the provision of a novel winch unit for use in automobile chaining operations on automobile transport trailers and the like wherein the winch bar is prevented from becoming accidentally disengaged from the winch while pressure is being applied to the bars.

Another object of the present invention is the provision of a novel winch drum and bar unit for use on automobile carrier trailers and the like wherein the winch drum and bar are provided with interlocking formations for releasably locking the winch bar against accidental withdrawal from the drum socket therefor during manipulation of the bar and drum in a chaining operation.

Other objects, advantages and capabilities of the present invention will become apparent from the following detailed description, taken in conjunction with the accompanying drawing showing one preferred embodiment of the invention.

In the drawing:

Figure 1 is a front elevation of the winch unit of the present invention assembled on a portion of an automobile carrier trailer frame;

Figure 2 is a vertical section view taken along the line 2—2 of Figure 1;

Figure 3 is a vertical section view taken on the line 3—3 of Figure 1;

Figure 4 is a side elevation of the winch bar; and

Figure 5 is an end elevation of the winch bar.

Referring to the drawing, wherein like reference characters designate corresponding parts throughout the several figures, the winch drum unit indicated generally by the reference character 10, comprises a winch shaft 11 having a hook 12 welded thereon to which the chain 13 is secured. The shaft 11 serves as the drum about which the chain 13 is wound and is journalled for rotation about its axis in supporting brackets or arms 14 welded or otherwise affixed to the framework 15 of the automobile carrier trailer. Suitable bearing 16 may be provided in the brackets 14 for journalling the shaft 11.

A winch head 17 of cylindrical form is welded or otherwise affixed to the end of the shaft 11 remote from the brackets 14 at an accessible location adjacent a side of the trailer. The winch head 17 is formed with a core unit 19 and a pair of face plates 20 and 21 welded together into a single unit. The two face plates 20, 21 are provided with aligned apertures at their centers for reception of the shaft 11, and the core unit 19 is formed of six identical generally triangular blocks 22 each having an arcuate face 23, a planar face 24 and a locking face 25 having a notch 26 recessed therein bounded by a locking shoulder 27 at its outer side and a stop shoulder 28 at its inner side. The blocks 22 are equally spaced from each other and define six radial sockets 29 which open through the periphery of the winch head 17 and are bounded on one side by the planar faces 24 and on the opposite side by the locking faces 25.

These radial sockets 29 are designed to receive the winch bar 30 therein to permit sufficient leverage to be applied to the winch head 17 to perform the chaining operation. The winch bar 30, as shown in Figures 3, 4 and 5 is provided with an intermediate portion 31 terminating at one end in an end member 32 in the shape of an elongated block which is axially aligned with the axis of the intermediate portion 31 and at the other end in an identically shaped end member 33 whose axis is inclined to the axis of the portion 31. The blocks 32, 33 are each of appropriate cross-section to fit readily into the sockets 29 in the winch head 17 and have a notch 34 appropriately shaped and positioned to bring the side 35 thereof against the shoulders 27 of the locking notches 26, as shown in dotted lines in Figure 3, when pressure is applied to the bar 30 to wind up the winch shaft 11 and tension the chain 13 and prevent accidental discharge of the bar 30 from the winch head sockets. The stop shoulders 28 of each of the triangular blocks 22 project into the sockets 29 a sufficient distance to limit inward insertion of the bar 30 into the sockets 29.

A ratchet 36 is welded to the side of the face plate 21 of the winch head 17 and is apertured at its center to receive the winch shaft 11 therethrough. A dog or pawl 37 is supported on an extension arm 38 of the bracket 14 and is arranged to drag over the ratchet teeth when the winch head 17 is rotated in a direction to tighten the chain 13 and to drop into one of the notches between the ratchet teeth and dog the ratchet 36 and winch head 17 against rotation in the reverse direction when the rotating pressure on the winch in the tightening direction is released.

In order to operate the winch unit 10 of the present invention to tighten up one of the chains by which the automobile is securely held on the automobile carrier trailer, the chain 13 is coupled at one end thereof to the hook 12 on the winch shaft 11 and either the aligned end member 32 or the inclined end member 33 of the winch bar 30, whichever disposes the exposed portion of the winch bar at a more convenient position, is inserted into one of the sockets 29 of the winch head 17 until its end abuts the stop shoulder 28 limiting further projection of the winch bar into the socket. Force is then applied to the exposed portions of the winch bar 30 to rotate the winch head 17 in a clockwise direction as viewed in Figure 3, through an arc corresponding to the range through which the operator can conveniently shift the winch bar 30. While such clockwise force is applied to the winch bar 30, the end member 32 will assume the position illustrated in dotted lines in Figure 3 wherein the side 35 of the notch 34 laps the outer portion of the shoulder 27 of the locking notch 26, thereby restraining the winch bar 30 against accidental withdrawal from the socket 29. At the end of the clockwise stroke, the pawl 37 will dog the ratchet 36 and winch head 17 against counterclockwise rotation and the end member 32 of the winch bar 30 may be easily removed from the socket 29 by shifting the same into substantial alignment with the axis of the socket 29. Either the aligned end member 32 or the inclined end member 33 may then be inserted into another socket 29 and the winch bar 30 and winch head 17 advanced through another stroke in the same manner as before. The present invention therefore provides a winch unit wherein notches in one bounding surface of the sockets in the winch head and in the adjacent surface of the winch bar coact while chain-tightening pressure is applied to the winch bar 30 to lock the winch bar 30 against accidental dislodgement from the winch head 17 and thereby avoid the injuries which occur during operation of the standard winch units employed on automobile carrier trailers when the winch bar slipped out of the winch head sockets.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

I claim:

1. A load securing device for a freight transportation vehicle comprising an operating bar terminating in at least one end portion having a notch adjacent the end thereof bounded adjacent said end by a wall extending transversely to the axis of said end portion, a shaft adapted to be journalled for rotation about its axis on said vehicle and having means for anchoring a load binding band to said shaft to be wound about said shaft, manually operable means for rotating said shaft comprising a cylindrical member secured to said shaft, said cylindrical member having a plurality of sockets extending radially from the axis of said cylindrical member and opening through the periphery thereof for the reception of the end portion of said operating bar, means bounding each of said sockets including a bearing surface adjacent the socket entrance positioned to form a fulcrum surface for the end portion of said operating bar and a wall disposed on the opposite side of the socket from said bearing surface having a shoulder projecting transversely of the axis of the socket disposed to coact with said notch bounding wall of said operating bar end portion to lap said notch bounding wall when pressure is applied to said operating bar in a direction to wind said band upon said shaft and restrain said operating bar from accidental withdrawal from the socket.

2. A load securing device for a freight transportation vehicle comprising a winch unit adapted to be supported on said vehicle including a shaft journalled for rotation about its axis, said shaft having means for anchoring a load restraining chain or the like to said shaft to be wound about said shaft, a winch head for rotating said shaft comprising a cylindrical member fixed to said shaft and having a plurality of sockets extending radially from the axis of said head and opening through the periphery thereof for the reception of an operating bar, said winch head having an uninterrupted bearing wall bounding the side of each of said sockets disposed in the direction of movement of the winch head to wind said chain upon the shaft and an opposite wall bounding each of said sockets having a notch recessed therein in spaced relation to the entrance of the socket, a shoulder forming the bounding surface of each of said notches along the side of the notches adjacent the socket entrances and extending substantially perpendicular to the axes of the sockets, and a winch bar having an end formation integral therewith adapted to be inserted in one of said sockets, said end formation having a recess therein spaced slightly from the end of said bar and bounded by a shoulder forming surface extending substantially perpendicular to the axis of said end formation, said shoulder bounding the notch in each of said sockets being disposed outwardly of said shoulder forming surface of said bar end formation and lapping the latter when said bar end formation is inserted fully into one of said sockets and pressure is applied to said bar to rotate said winch head in a direction to wind said chain about said shaft for restraining said bar from accidental dislodgement from the socket.

3. A load securing device for a freight transportation vehicle comprising a winch unit adapted to be supported on said vehicle including frame members adapted to be secured to the vehicle, a shaft journalled for rotation about its axis in said frame members, said shaft having a hook welded thereto for anchoring a load restraining chain or the like to said shaft to be wound about said shaft, a winch head for rotating said shaft comprising a cylindrical member fixed to said shaft and having a plurality of sockets of substantially rectangular cross-section extending radially from the axis of said head and opening through the periphery thereof for the reception of an operating bar, said winch head having associated with each of said sockets an uninterrupted bearing wall extending substantially radially thereof and forming the side of the socket disposed in the direction of chain-tightening movement of the winch head and an opposite wall bounding the socket having a notch recessed therein in spaced relation to the entrance of the socket, a shoulder forming the bounding surface of each of said notches along the side of the notches adjacent the socket entrances and extending substantially perpendicular to the axes of the sockets and a projecting wall forming the opposite side of each of the notches extending into the associated socket forming a limit stop, and a winch bar having an end formation of rectangular cross-section integral therewith adapted to be inserted in one of said sockets, said end formation having a recess therein spaced slightly from the end of said bar and bounded by a shoulder forming surface extending substantially perpendicular to the axis of said end formation, said shoulder bounding the notch in each of said sockets being disposed outwardly of said shoulder forming surface of said bar end formation and lapping the latter when said bar end formation is inserted fully into one of said sockets against said limit stops and pressure is applied to said bar to rotate said winch head in a direction to wind said chain about said shaft for restraining said bar from accidental dislodgement from the socket.

References Cited in the file of this patent

UNITED STATES PATENTS

| | | |
|---|---|---|
| 329,704 | Bond | Nov. 3, 1885 |
| 1,546,203 | Clarke | July 14, 1925 |
| 2,407,912 | Zimmer | Sept. 17, 1946 |